United States Patent [19]

Lind

[11] Patent Number: 5,549,945
[45] Date of Patent: Aug. 27, 1996

[54] ABSORBENT MAT

[76] Inventor: Bruce B. Lind, Rte. 1 Box 302-D, Hull, Ga. 30646

[21] Appl. No.: 497,976

[22] Filed: Jul. 3, 1995

[51] Int. Cl.⁶ .............................. B32B 1/06; B32B 33/00; B65D 65/38; B65D 81/00; B65D 85/00

[52] U.S. Cl. .............................. 428/35.5; 15/215; 15/216; 206/389; 206/409; 206/410; 206/524.1; 428/74; 428/76; 428/124; 428/192; 428/283; 428/906

[58] Field of Search .............................. 428/285, 35.5, 428/74, 76, 124, 192, 283, 906; 206/389, 409, 410, 524.1; 15/215, 216

[56] References Cited

U.S. PATENT DOCUMENTS 4,684,562 8/1987 Hartkemeyer .
4,798,754 1/1989 Tomek .
5,114,774 5/1992 Maxim, Jr. .
5,221,568 6/1993 Heerten et al. .

*Primary Examiner*—James C. Cannon
*Attorney, Agent, or Firm*—Michael I. Kroll

[57] ABSTRACT

An improved absorbent mat for absorbing oil and other liquid drippings beneath a motor vehicle, comprising a first bottom impervious flexible layer to be placed upon a support surface beneath the motor vehicle. A second intermediate absorbent flexible layer is disposed upon the first bottom impervious layer. A third top permeable flexible layer is disposed upon the second intermediate absorbent layer.

5 Claims, 2 Drawing Sheets

ABSORBENT MAT

BACKGROUND OF THE INVENTION

1. Field of the Invention

The instant invention relates generally to liquid absorbing mats and more specifically it relates to an improved absorbent mat.

2. Description of the Prior Art

Numerous liquid absorbing mats have been provided in prior art. For example, U.S. Pat. Nos. 4,684,562 to Hartkemeyer; 4,798,754 to Tomek; 5,114,774 to Maxim, Jr. and 5,221,568 to Heerten et al. all are illustrative of such prior art. While these units may be suitable for the particular purpose to which they address, they would not be as suitable for the purposes of the present invention as heretofore described.

HARTKEMEYER, ROBERT

MAT FOR ABSORBING OIL AND OTHER LIQUIDS

U.S. Pat. No. 4,684,562

The present invention relates to an apparatus designed to catch drippings including three sheets, one formed from an absorbent, isotropically permeable material supported by a second sheet formed from an absorbent material for absorbing drippings. These two sheets further are supported by a third sheet that is liquid-resistant, one side of which is covered by a foil material, this foil-backed sheet further preventing liquid leakage. The three sheets are bonded together by a sealing ring, tape, or adhesive.

TOMEK, LAWRENCE S.

OIL-ABSORBENT FLOOR MAT

U.S. Pat. No. 4,798,754

A lightweight, disposable absorbent mat is adapted for placement beneath a motor vehicle or machine to catch oil, grease and other drippings and comprises a generally rectangular base layer which is made up of an oil-impervious material. A plurality of upper, oil-absorbent plies are interconnected to one another and superimposed on the base layer. The plies being made up of a highly absorbent paper or cellulose material. The plies of paper material are interconnected at spaced intervals and may be covered with an upper plastic layer which is perforated to permit any drippings to pass through the upper layer into the absorbent plies. The upper layer has an outer peripheral edge or edges sealed to the outer peripheral edges of the bottom layer to form a moisture barrier around the sides of the absorbent plies. Stiffener frame members may be interposed between the outer peripheral edges of the upper and base layers.

MAXIM, JR., HENRY A.

ABSORBENT FLOOR MAT

U.S. Pat. No. 5,114,774

A floor mat system is disposed wherein the floor mat is removably attachable to an existing floor, and enables the use of the floor by pedestrians in wet and oily environments. The mat includes a skid-free upper surface bounded by an edging portion either or both of which has self-gripping fastener means attached thereto and a removable portion which is capable of absorbing liquids such as water or oil coming in contact therewith. The removable portion is adapted to be removably attached to the fastener means, to provide for removal and cleaning of the removable portion and is positioned below the skid-free upper surface and edging portion.

HEERTEN, GEORG

JOHANNSSEN, KARSTEN

MULLER, VOLKARD

WATER AND/OR OIL-PERMEABLE SEALING MAT CONSISTING SUBSTANTIALLY OF A SUBSTRATE LAYER, A LAYER OF SWELLABLE CLAY AND A COVER LAYER

U.S. Pat. No. 5,221,568

A water and/or oil-impermeable sealing mat is provided in form of a bentonite non-woven fabric combination with the possibility of transmitting shear from one batt layer to the other. On a slope shearing forces can be transmitted by the covering batt material through a layer of swellable clay into the supporting batt material. Such a sealing mat is a fiber-reinforced mineral seal, permitting the transmission of shearing forces on slopes, without the risk of the layer of swellable clay itself becoming the preferred sliding plane. The sealing mat consists of a non-woven textile material as substrate layer, a layer of swellable clay, preferably sodium bentonite, and a cover layer consisting preferably also of a non-woven textile material. All three layers having been needle punched together in the conventional manner in a needle loom. When moistened, the clay swells and forms the water and/or oil-impermeable layer. The water and/or oil-impermeable sealing mat is used especially in hydraulic engineering and in waste disposal engineering.

SUMMARY OF THE INVENTION

A primary object of the present invention is to provide an improved absorbent mat that will overcome the shortcomings of the prior art devices.

Another object is to provide an improved absorbent mat that is multi-layered to absorb oil and other liquids, such as motor vehicle drippings, to prevent contamination to a support surface.

An additional object is to provide an improved absorbent mat that can be rolled up and placed into a closable disposal bag attached thereto, so as to be discarded in a safe manner.

Another additional object is to provide an improved absorbent mat to bioremediate the absorbed oil and fluids, so as to allow a safe environmental and economical disposal.

A further object is to provide an improved absorbent mat that is simple and easy to use.

A still further object is to provide an improved absorbent mat that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
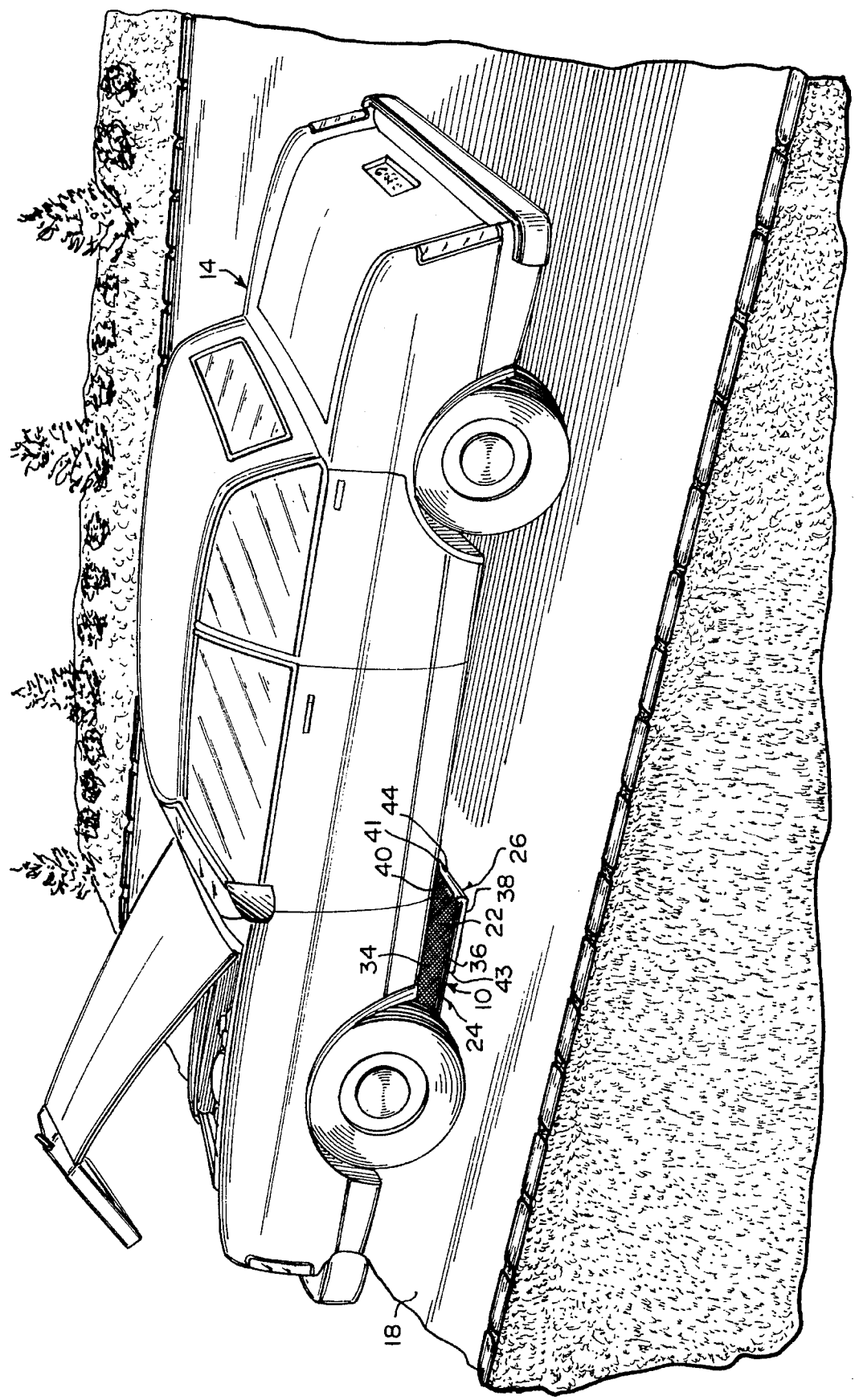
FIG. 1 is a perspective view of the instant invention being used under a motor vehicle on a support surface to catch drippings therefrom.
Figure 2:
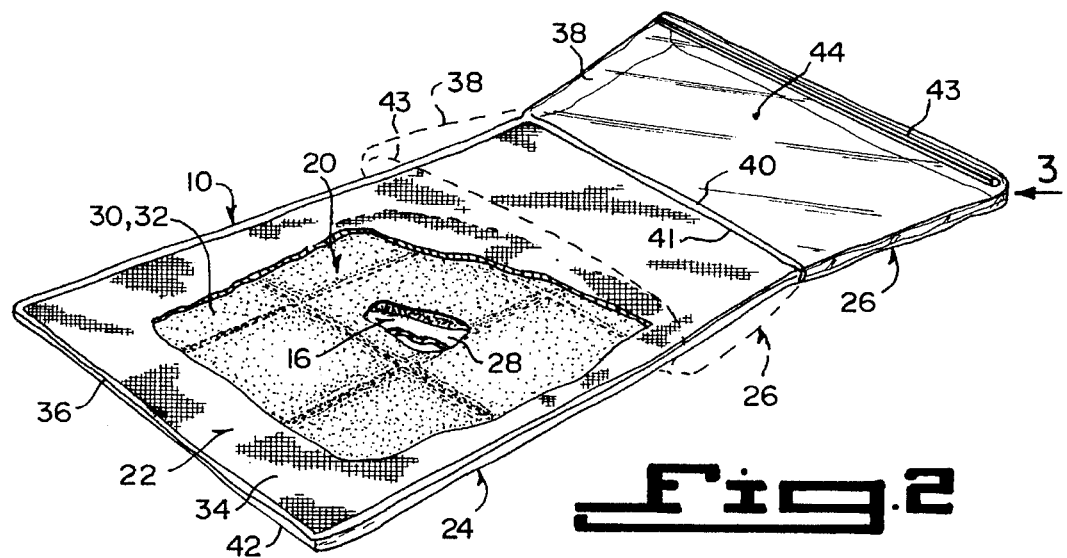
FIG. 2 is a front perspective view of the instant invention per se, with parts broken away to show the various layers therein.
Figure 3:
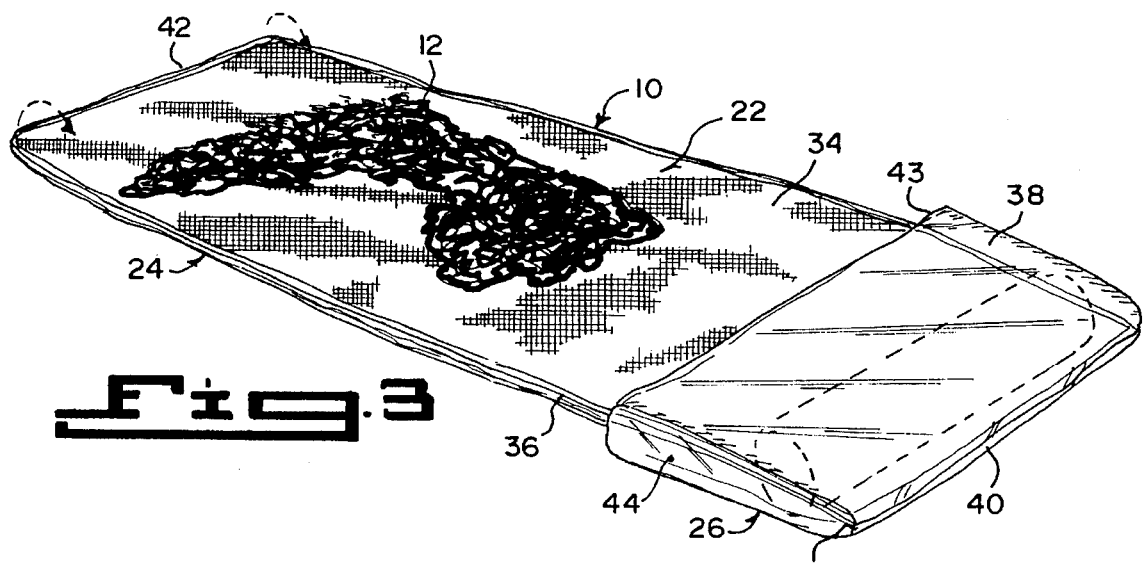
FIG. 3 is a rear perspective view taken in the direction of arrow 3 in FIG. 2.
Figure 4:
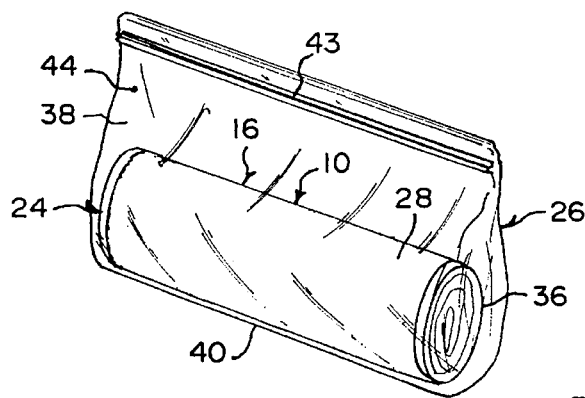
FIG. 4 is a perspective view showing the mat rolled up and placed into the closable disposal bag attached thereto.

Turning now descriptively to the drawings, in which similar reference characters denote similar elements throughout the several views, FIGS. 1 through 4 illustrate an improved absorbent mat 10 for absorbing oil and other liquid drippings 12 beneath a motor vehicle 14, comprising a first bottom impervious flexible layer 16 to be placed upon a support surface 18 beneath the motor vehicle 14. A second intermediate absorbent flexible layer 20 is disposed upon the first bottom impervious layer 16. A third top permeable flexible layer 22 is disposed upon the second intermediate absorbent layer 20.

A facility 24 is for securing the first bottom impervious flexible layer 16, the second intermediate absorbent flexible layer 20 and the third top permeable flexible layer 22 together about the edges thereof. A component 26 is for retaining the mat 10 in a rolled up state, so that the mat 10 can be discarded in a safe manner. The retaining component 26 is folded under and removably adhered to the underside of the first bottom impervious layer 16.

The first bottom impervious flexible layer 16 is fabricated out of a thin plastic liquid resistant sheet 28. The second intermediate absorbent flexible layer 20 is fabricated out of a thick cellulose wadding material 30, impregnated with a liquid absorbing powder 32, which has oil bioremediating properties. The third top permeable flexible layer 22 is fabricated out of a thin fabric liquid porous sheet 34.

The first bottom impervious flexible layer 16, the second intermediate absorbent flexible layer 20 and the third top permeable flexible layer 22 are rectangular shaped, of the same size and approximately but not limited to being three feet in width and six feet in length. The securing facility 24 is a heat seal 36 formed about the perimeter of the first bottom impervious flexible layer 16, the second intermediate absorbent flexible layer 20 and the third top permeable flexible layer 22.

The retaining component 26 is a disposal bag 38 affixed at its bottom end 40 to a first side 41 of the mat 10. When the mat 10 is rolled up from a second side 42, the disposal bag 38 can be turned inside out to receive the rolled up mat 10 for proper removal thereof.

The disposal bag 38 contains a closeable seal end 43 opposite from the bottom end 40. The closeable seal end 43 can be sealed closed after the rolled up mat 10 is inserted into the disposal bag 38. The disposal bag 38 is fabricated out of a thin transparent plastic liquid resistant material 44.

OPERATION OF THE INVENTION

To use the improved absorbent mat 10, the following steps should be taken:

1. Place the mat 10 with the first bottom impervious flexible layer 16 flat upon the support surface 18 beneath the motor vehicle 14, with the disposal bag 38 folded under and removably adhered to the underside of the first bottom impervious flexible layer 16.
2. Allow the oil and other liquid drippings 12 to fall upon the third permeable flexible layer 22 and enter into the second intermediate absorbent flexible layer 20.
3. Roll the mat 10 up from the second side 42 opposite from the first side 41 at the bottom end 40 of the disposal bag 38.
4. Turn the disposal bag 38 inside out, so that the rolled up mat 10 can enter therein.
5. Seal close the closeable seal end 43 for proper removal and disposal of the mat 10.

LIST OF REFERENCE NUMBERS 10 improved absorbent mat
12 oil and other liquid drippings
14 motor vehicle
16 first bottom impervious flexible layer of 10
18 support surface
20 second intermediate absorbent flexible layer of 10
22 third top permeable flexible layer of 10
24 securing facility for 16, 20, 22
26 retaining component of 10
28 thin plastic liquid resistant sheet for 16
30 thick cellulose wadding material for 20
32 liquid absorbing powder in 30
34 thin fabric liquid porous sheet for 22
36 heat seal for 24
38 disposal bag for 26
40 bottom end of 38
41 first side of 10
42 second side of 10
43 closeable seal end of 38
44 thin transparent plastic liquid resistant material of 38

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved absorbent mat for absorbing oil and other liquid drippings beneath a motor vehicle comprising:
   a) a first bottom impervious flexible layer to be placed upon a support surface beneath the motor vehicle;
   b) a second intermediate absorbent flexible layer disposed upon said first bottom impervious layer;
   c) a third top permeable flexible layer disposed upon said second intermediate absorbent layer;
   d) a retaining means, said retaining means being a disposal bag affixed at its bottom end to a first side of said mat, so when said mat is rolled up from a second side, said disposal bag can be turned inside out to receive said rolled up mat for proper removal thereof.

2. An improved absorbent mat as recited in claim 1, wherein said disposal bag included a closeable seal end opposite from said bottom end, so that said closeable seal end can be sealed closed after said rolled up mat is inserted into said disposal bag.

3. An improved absorbent mat as recited in claim 1, wherein said disposal bag is fabricated out of a thin transparent plastic liquid resistant material.

4. An improved absorbent mat for absorbing oil and other liquid drippings beneath a motor vehicle comprising:
   a) a first bottom impervious flexible layer to be placed upon a support surface beneath the motor vehicle;
   b) a second intermediate absorbent flexible layer disposed upon said first bottom impervious layer;
   c) a third top permeable flexible layer disposed upon said second intermediate absorbent layer;
   d) a retaining means, said retaining means being a disposal bag affixed at its bottom end to a first side of said mat, so when said mat is rolled up from a second side, said disposal bag can be turned inside out to receive said rolled up mat for proper removal thereof, said disposal bad including a closable seal end opposite from said bottom end, so that said closeable seal end can be sealed closed after said rolled up mat is inserted into said disposal bag.

5. An improved absorbent mat for absorbing oil and other liquid drippings beneath a motor vehicle comprising:
   a) a first bottom impervious flexible layer to be placed upon a support surface beneath the motor vehicle;
   b) a second intermediate absorbent flexible layer disposed upon said first bottom impervious layer;
   c) a third top permeable flexible layer disposed upon said second intermediate absorbent layer;
   d) a retaining means, said retaining means being a disposal bag affixed at its bottom end to a first side of said mat, so when said mat is rolled up from a second side, said disposal bag can be turned inside out to receive said rolled up mat for proper removal thereof, said disposal bad including a closable seal end opposite from said bottom end, so that said closeable seal end can be sealed closed after said rolled up mat is inserted into said disposal bag, said disposal bag being fabricated out of a thin transparent plastic liquid resistant material.

* * * * *